Nov. 24, 1942.  W. H. BAGLEY ET AL  2,302,660
METHOD OF MAKING BEARINGS
Filed Jan. 5, 1942
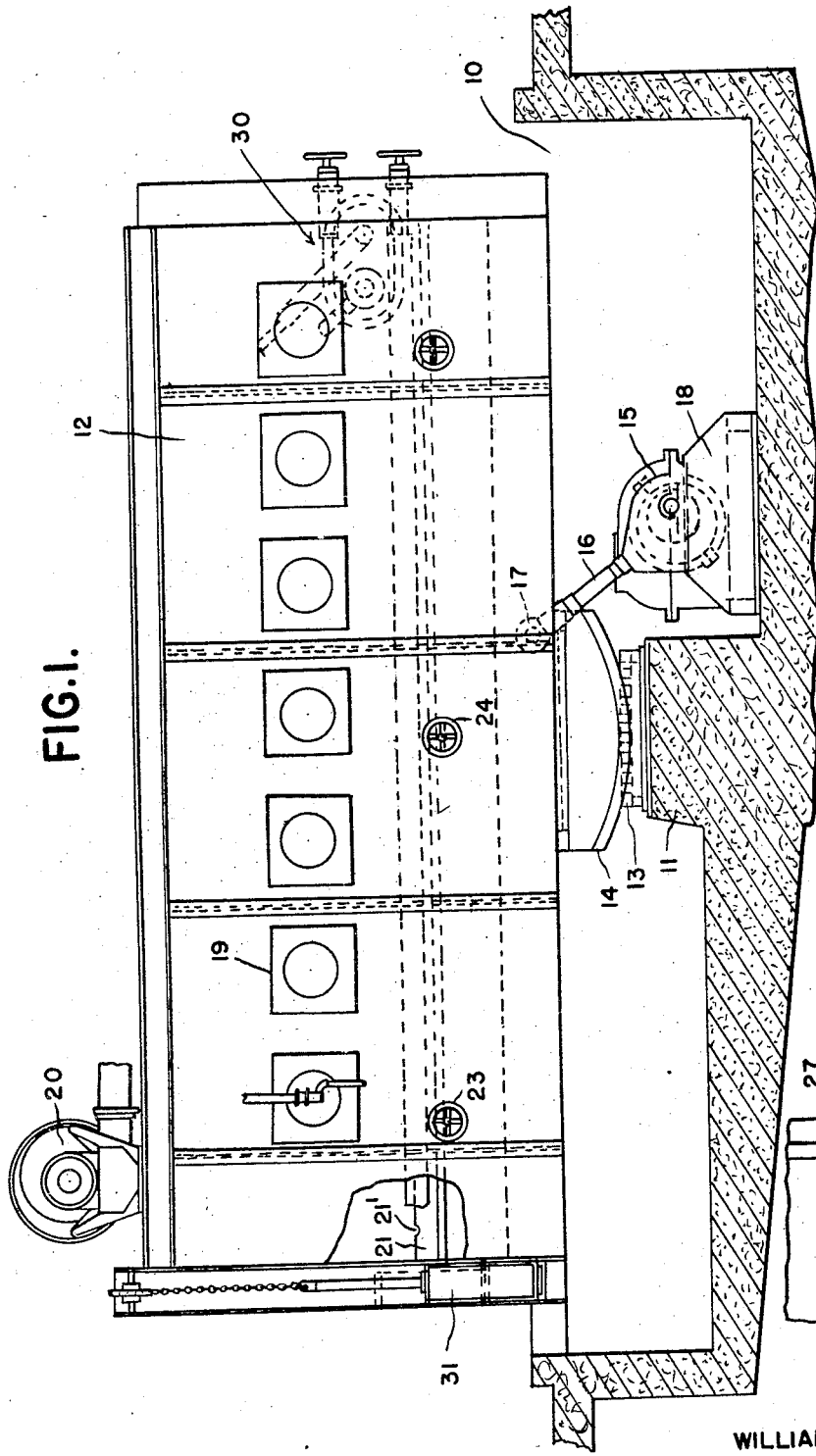
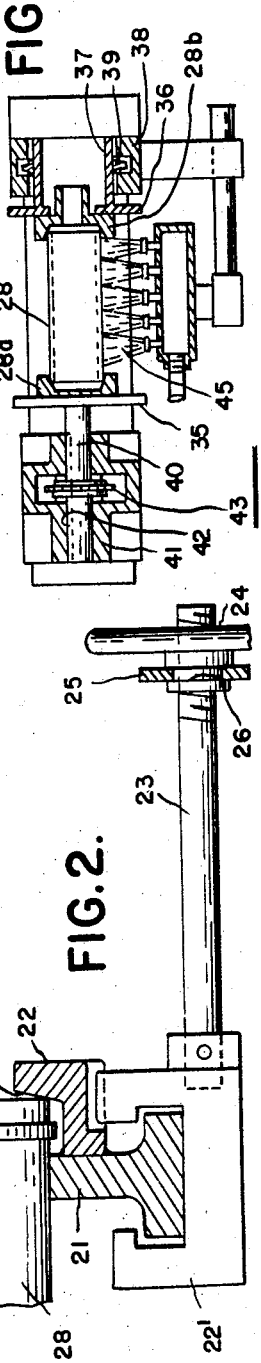
INVENTORS
WILLIAM H. BAGLEY
CHARLES E. EGGENSCHWILER
BY
ATTORNEYS Patented Nov. 24, 1942

2,302,660

UNITED STATES PATENT OFFICE 2,302,660

METHOD OF MAKING BEARINGS

William H. Bagley and Charles E. Eggenschwiler, Detroit, Mich., assignors to Bohn Aluminum & Brass Corporation, Detroit, Mich., a corporation of Michigan Application January 5, 1942, Serial No. 425,706

5 Claims. (Cl. 22—203)

The invention relates to journal bearings of that type comprising a reinforcing shell or backing provided with a lining of bearing metal welded or affixed to the inner surface of the shell and consists primarily in a novel method of production.

Bearings of the type referred to may be conveniently produced by providing a shell of a length in excess of a finished bearing, applying the bearing material to the shell interior and thereafter cutting the lined shell into parts, and it is to this method of manufacture that the present invention is an improvement.

Briefly described, in the preferred practice, the bearing metal, in finely divided condition, is placed within the shell or tube which may be of a length to form a plurality of bearings. The shell and bearing metal at this time are in a substantially cool state. The ends of the shell are substantially closed, and the shell and lining metal are simultaneously heated in a nonoxidizing atmosphere.

During the heating, which melts the bearing material, the shell is positioned preferably with its axis substantially horizontal and may be either intermittently or continually turned or rolled about its longitudinal axis. As a result of the rolling, the lining metal wipes over the entire inner surface of the shell, effectively wetting the same and providing a protective film which prevents oxidation of the surfaces and which, at the high temperature of the parts contemplated herein, welds to the shell interior.

Thereafter the shell with the molten bearing metal therein is put in a spinner and spun rapidly to distribute the molten bearing metal substantially uniformly over the inner surface of the shell. Cooling is accomplished through the shell, as by spraying the surface of the shell with water.

With the foregoing general description in mind, it is an object of the present invention to make bearings for motor vehicles by a method which avoids oxidation of the shell without using fluxes, provides a uniform welded bond between the lining and shell, and which results in rapid, high quantity production.

More specifically it is an object of the present invention to make bearings by a method which includes the steps of melting a charge of bearing metal in a bearing shell while rolling said shell in a non-oxidizing atmosphere.

It is a further object of the present invention to make bearings by a method which includes the steps of placing a charge of unmelted bearing metal in a cool, cylindrical bearing shell, and rolling said shell while heating said shell and bearing metal in a nonoxidizing atmosphere to melt said bearing metal.

It is a further object of the present invention to manufacture bearings by a method which includes the steps of periodically introducing individual bearing shells charged with unmelted bearing metal into a hot, nonoxidizing atmosphere so as to provide a plurality of shells in said atmosphere, melting the bearing metal, coating the interior of the shell with a portion of the bearing metal while in said atmosphere, and periodically withdrawing individual heated shells in the order of their introduction.

Other objects of the invention will be apparent as the description proceeds and when taken in conjunction with the accompanying drawing, wherein:

Figure 1 is a side elevation, partly in section, of a furnace for carrying out the present method;

Figure 2 is a fragmentary vertical section through a supporting rail; and

Figure 3 is a side elevation, partly in section, of apparatus for spinning and cooling bearings.

While the steps which make up the present method may be carried out manually, or by various different apparatus, we have illustrated herein a preferred form of furnace for practicing the invention.

As seen in Figure 1, a pit 10 is provided in the foundry floor, and a supporting pedestal 11 is built up therein.

An elongated furnace 12 is mounted on the pedestal 11 for tilting movement. A short rack section 13 is positioned on the pedestal, and an arcuate rack 14 is secured to the underside of the furnace.

Drive mechanism comprising a motor 15 is connected to the furnace 12. We have shown a link 16, pivoted as indicated at 17 to the furnace, and having an eccentric drive indicated generally at 18 driven from a shaft of the drive mechanism.

When the motor is energized, the furnace 12 is rolled slightly along the plane of rack section 13, thus tilting the furnace. The link 16 is so adjusted that the furnace is tilted alternately a few degrees to either side of a horizontal position.

A plurality of glow tube burners indicated at 19 are provided, to which gas and combustion air are provided. A blower for supplying combustion air to the burners is shown at 20. The temperature may be regulated by suitable thermostatic means. Temperatures sufficient to superheat the parts are used, so as to provide welded film of bearing metal to the inside of the shell, as is well understood in the art.

Outside of the burners, the atmosphere in the furnace 12 is kept nonoxidizing, to prevent oxidation of the shells during heating; and particularly to prevent oxidation of the interior of the shells before they receive the first protective coating of melting bearing metal as a result of the rolling operation. This may be accomplished in any known manner, such as by controlling the admission of air and by the presence of carbonaceous matter in the furnace, which at the elevated temperatures prevailing, combines with the oxygen.

Extending longitudinally of the furnace 12 at opposite sides thereof are rails 21, seen in Figure 2. Rails 21 have guide bars 22 secured thereto which bars extend along for the full length of the rails. The rails are supported for lateral adjustment by brackets 22'. Secured to the brackets 22' are adjusting screws 23 which extend to the outside of the furnace. Handwheels 24 are threaded to receive the projecting ends of screws 23, and the handwheels are mounted for rotation while held against axial movement by slotted supports 25 engaging in annular grooves 26 in the handwheels. By this means rails 21 and guide bars 22 may be adjusted laterally to accommodate bearing shells of various lengths.

The guide bars 22 each have an inclined guiding surface 27 which the end of a cylindrical bearing shell 28 will engage if the shell runs askew on its supporting rails 21. The shell will have substantially point contact with the guide bar 22, at a point close to the bottom of the shell, so that the shell will be straightened on the rails 21 and roll freely thereon.

Means are provided for introducing the charged bearing shells adjacent one end of the furnace, and these means are indicated generally at 30. Details of this device form no part of the present invention, but in general it comprises a tube open at one end laterally of the furnace, the tube being cut away along one side, and rotatable, whereby a shell in the tube will be deposited on the rails when the tube is rotated.

At the discharge end of the furnace the rails 21 are each provided with a recess 21' into which the bearing shell nearest to the discharge end drops when the furnace tilts in that direction. The discharge end of the furnace is provided with a normally closed door which preferably is equipped with power means, such as air cylinder 31, for raising the door to give access for removing a shell.

In operation of the furnace, there will be a series of bearing shells on the rails 21. The number of shells will be such that at least sufficient space will remain to permit the shells to roll completely over upon tilting of the furnace. The number of shells is kept constant by introducing a cold shell through the means 30 for each each heated shell removed from the discharge end.

The motor 15 will cause tilting of the furnace at regular intervals, and the set of shells in the furnace will roll over at each tilting of the furnace. When a heated shell reaches the recesses in the rails at the discharge end of the furnace, it remains there, even though the furnace tilts the other direction. This is so that the last heated shell may be removed from the furnace readily at any time.

The frequency of tilting may be varied within wide limits. It is unnecessary to keep the shells continuously in motion, although no ill effects would result. On the other hand, the shells should not be permitted to remain stationary for an excessive period, since the molten bearing metal would react with the shell material and produce a thin zone in it. Excellent results are obtained when the furnace is tilted in both directions about once a minute.

We have found that by the practice of the present method, it is not necessary to use fluxes or deoxidizers in conjunction with the bearing shells. The bearing shells are charged with finely divided, solid bearing metal, and the ends of the shells are closed sufficiently to prevent the bearing metal from running out, as by caps 28a and 28b, seen in Figure 3. The charged shells are introduced, one at a time, into the furnace where they are heated and rolled. The temperatures employed will depend upon the specific bearing metal, but in all cases temperatures well above the melting point of the bearing metal will prevail.

When the heated shell is removed from the discharge end of the furnace, the bearing metal is melted and has coated the inner surface of the shell, thus protecting it against oxidation. In addition, the bond between the shell and coating is a uniform weld.

The bearing is further processed by spinning rapidly with its axis horizontal to distribute the balance of the bearing metal uniformly over the shell interior, and cooling. The bearing metal is finally broached to desired dimensions.

The spinning and cooling operation may conveniently be carried out simultaneously, and for this purpose we have illustrated in Figure 3 apparatus for simultaneously spinning and cooling the bearings. In this figure the bearing is indicated at 28 as mounted between rotary heads 35 and 36. The head 36 has a shaft portion 37 extending within a bracket 38, and a sprocket 39 is connected to the shaft portion 37. A driving chain (not shown) is connected to the sprocket 39. The head 35 has a shaft 40 which extends within a bracket 41 and has a spline connection as indicated at 42 with a sprocket 43. A chain (not shown) is supplied in driving relation to the sprocket 43.

Chains which drive the sprockets 39 and 43 will effect rapid rotation or spinning of the bearing or shell 28 on its axis, as is clearly apparent in Figure 3. This spinning is carried out at a speed sufficient to insure substantially uniform distribution of the molten bearing metal in the shell 28. It will be recalled at this time that the interior of the bearing shell 28 is provided with a thin welded coating of bearing metal. In addition there remains a relatively large quantity of molten bearing metal therein.

When the bearing shell 28 has attained sufficient spinning speed, a cooling spray, as indicated at 45, is applied, which will cool the shell 28 rapidly and will cause the molten metal therein to solidify rapidly.

While we have illustrated and described a particular form of apparatus for carrying out the novel steps of our improved method, it will be understood that this has been done merely to teach a preferred mode of practicing the present invention, the true scope of which is indicated by the appended claims.

What we claim as our invention is:

1. In the manufacture of bearings, the steps of periodically introducing individual, cool bearing shells charged with unmelted bearing metal into a hot, nonoxidizing atmosphere containing a plurality of such shells, supporting all of said shells with their axes horizontal, rolling all of said shells along a path of travel extending across said atmosphere, and periodically withdrawing individual shells as they complete traverse of said atmosphere.

2. In the manufacture of bearings, the step of rolling a series of bearing shells initially charged with unmelted bearing metal along a path of travel on a support within a hot nonoxidizing atmosphere for a period sufficient to melt the bearing metal and wipe the same uniformly over the shell interior.

3. In the manufacture of bearings, the steps of periodically introducing cool tubular bearing shells charged with unmelted bearing metal into a hot, nonoxidizing atmosphere onto a tiltable, generally horizontal support carrying a plurality of such shells, periodically tilting the support to opposite inclinations from the horizontal to roll said shells along said support, and periodically withdrawing heated bearing shells from said support in the order of their introduction.

4. In the manufacture of bearings, the steps of successively adding individual bearing shells charged with unmelted bearing metal to a series of such shells located in a hot, nonoxidizing atmosphere, rolling said shells progressively across said atmosphere, thereby melting said bearing metal, and wiping the inner surface of said shells with melted bearing metal, and successively withdrawing individual shells from said atmosphere at the other side thereof.

5. In the manufacture of bearings, the steps of introducing a plurality of bearing shells charged with unmelted bearing metal into a hot non-oxidizing atmosphere to rest upon a common support, rolling said shells on said support, and withdrawing said shells from said atmosphere and support after a predetermined heat treatment.

WILLIAM H. BAGLEY.
CHARLES E. EGGENSCHWILER.